United States Patent
Ludsteck et al.

(10) Patent No.: US 12,246,374 B2
(45) Date of Patent: Mar. 11, 2025

(54) METHOD AND DEVICE FOR MONITORING AND/OR CONTROLLING A FLOW-DRILLING AND THREAD-FORMING PROCESS

(71) Applicant: Atlas Copco IAS GmbH, Bretten-Gölshausen (DE)

(72) Inventors: Michael Ludsteck, Munich (DE); Manuel Guglhör, Benediktbeuren (DE)

(73) Assignee: Altas Copco IAS GmbH, Bretten-Goelshausen (DE)

( * ) Notice: Subject to any disclaimer, the term of this patent is extended or adjusted under 35 U.S.C. 154(b) by 86 days.

(21) Appl. No.: 17/836,806

(22) Filed: Jun. 9, 2022

(65) Prior Publication Data
US 2022/0395892 A1 Dec. 15, 2022

(30) Foreign Application Priority Data
Jun. 11, 2021 (DE) .......................... 102021115209.7

(51) Int. Cl.
*B21J 5/06* (2006.01)
*G05B 19/18* (2006.01)

(52) U.S. Cl.
CPC ............ *B21J 5/066* (2013.01); *G05B 19/182* (2013.01); *G05B 2219/37606* (2013.01); *G05B 2219/49333* (2013.01); *Y10T 29/49771* (2015.01)

(58) Field of Classification Search
None
See application file for complete search history.

(56) References Cited

U.S. PATENT DOCUMENTS

| | | | |
|---|---|---|---|
| 9,656,357 B2* | 5/2017 | Somnitz | B29C 65/48 |
| 9,901,974 B2 | 2/2018 | Pfeiffer | |
| 2011/0002751 A1* | 1/2011 | Katzenberger | B23B 47/28 |
| | | | 29/281.6 |
| 2015/0217395 A1* | 8/2015 | Spinella | B23K 11/11 |
| | | | 403/267 |
| 2015/0328676 A1* | 11/2015 | Zinn | B23K 20/1255 |
| | | | 173/4 |

(Continued)

FOREIGN PATENT DOCUMENTS

| CN | 107530880 A | 1/2018 |
|---|---|---|
| DE | 102007024627 B3 | 1/2009 |

(Continued)

OTHER PUBLICATIONS

Altvater et al., "Transition between flow-drill screwing systems considering joining process and joint characteristics", Apr. 2022, Advances in Industrial and Manufacturing Engineering. (Year: 2022).*

(Continued)

*Primary Examiner* — Mohammad Ali
*Assistant Examiner* — Kelvin Booker
(74) *Attorney, Agent, or Firm* — Calvert Technology Law, PLLC; Nathan H. Calvert

(57) ABSTRACT

A method and device are provided for simplifying a flow-drill screwing process. Based on work performed during the process, a process variable E is formed. This variable is compared to analogously formed comparison values in order to be able to determine the proper or faulty running of the process.

15 Claims, 1 Drawing Sheet

(56) References Cited

U.S. PATENT DOCUMENTS

| | | | | |
|---|---|---|---|---|
| 2015/0328677 | A1* | 11/2015 | Pfeiffer | F16B 25/106 29/505 |
| 2016/0167158 | A1* | 6/2016 | Spinella | B23K 11/20 403/270 |
| 2017/0045074 | A1* | 2/2017 | Kulzer | F16B 41/002 |
| 2017/0058934 | A1* | 3/2017 | Haak | F16B 25/106 |
| 2017/0130751 | A1* | 5/2017 | Norton | F16B 25/0021 |
| 2017/0316556 | A1* | 11/2017 | Spinella | B23K 11/20 |
| 2018/0238362 | A1* | 8/2018 | Ruszkiewicz | F16B 5/02 |
| 2020/0180045 | A1* | 6/2020 | Ono | B23B 49/02 |
| 2020/0271146 | A1* | 8/2020 | Plass | F16B 11/006 |
| 2020/0400183 | A1* | 12/2020 | Maiwald | F16B 25/106 |
| 2021/0039130 | A1* | 2/2021 | Hausner | B05C 5/0225 |
| 2021/0046559 | A1* | 2/2021 | Guglhör | G01L 5/00 |
| 2021/0187629 | A1* | 6/2021 | Hervouet | G05B 19/188 |
| 2023/0129583 | A1* | 4/2023 | Ruszkiewicz | F16B 25/0021 |

FOREIGN PATENT DOCUMENTS

| | | |
|---|---|---|
| DE | 102015005759 A1 | 12/2015 |
| DE | 102016007332 A1 | 12/2017 |
| DE | 102019207885 B3 | 8/2020 |
| EP | 1424167 A2 | 6/2004 |
| EP | 1775049 A2 | 4/2007 |
| EP | 2954973 A1 | 12/2015 |
| JP | 2006123123 A | 1/2006 |
| JP | 311793 U | 5/2006 |

OTHER PUBLICATIONS

Su et al., "Improving Friction Drilling and Joining Through Controlled Material Flow", 2018, Procedia Manufacturing 26 (2018) 663-670. (Year: 2018).*

Grujicic et al., "Process modeling, joint virtual testing and construction of joint connectors for mechanical fastening by flow-drilling screws", Apr. 2014, Proc IMechE Part B: J Engineering Manufacture 2017, vol. 231(6) 1048-1061. (Year: 2014).*

Liu et al., "Flow drill screw (FDS) technique: A state-of-the-art review", Jun. 2023, Journal of Manufacturing Processes 103 (2023) 23-52. (Year: 2023).*

Asian et al., "Experimental analysis of the flow drill screw driving process", May 2019, The International Journal of Advanced Manufacturing Technology (2019) 104:2377-2388. (Year: 2019).*

Asian et al., "Identification of Drilling Parameters during the Flow Drill Screw Driving Process", Apr. 2018, Key Engineering Materials Online: Apr. 24, 2018 ISSN: 1662-9795, vol. 767, pp. 465-471. (Year: 2018).*

Sonstabo et. al., "Behaviour and modelling of flow-drill screw connections", Mar. 2018, Thesis for the Degree of Philosophy, Norwegian University of Science and Technology Faculty of Engineering Department of Structural Engineering Doctor, (Year: 2018).*

Milner et al., "Residual Stresses in Flow Drill Screwdriving of Aluminum Alloy Sheets", 2016, Proceedings of the ASME 2016 International Manufacturing Science and Engineering Conference (MSEC2016), Jun. 27-Jul. 1, 2016. (Year: 2016).*

Aslan et al., "Experimental analysis of the flow drill screw driving process", May 2019, The International Journal of Advanced Manufacturing Technology (2019) 104:2377-2388. (Year: 2019).*

Fazaelizadeh, M., "Real Time Torque and Drag Analysis during Directional Drilling", Mar. 2013, Doctoral thesis, University of Calgary, Calgary, Canada. (Year: 2013).*

Liu et al., "A nonlinear dynamic model for characterizing downhole motions of drill-string in a deviated well", Jul. 2016, Journal of Natural Gas Science and Engineering 38 (2017). (Year: 2016).*

Dehghan et al., "Measurement and analysis of thrust force and torque in friction drilling of difficult-to-machine materials", Jun. 2019, The International Journal of Advanced Manufacturing Technology (2019) 105:2749-2769. (Year: 2019).*

Liu et al., "Method and apparatus for monitoring of downhole dynamic drag and torque of drill-string in horizontal wells", Jul. 2017, Journal of Petroleum Science and Engineering 164 (2018) 320-332. (Year: 2017).*

Wang et al., "Development of torque clutch drilling tool and evaluation of drag reduction performance", May 2018, Advances in Mechanical Engineering, 2018, vol. 10(10) 1-20. (Year: 2018).*

Aslan et al., "Identification of Drilling Parameters during the Flow Drill Screw Driving Process Drilling Parameters during the Flow Drill Screw Driving Process", Apr. 2018, Key Engineering Materials, vol. 767, pp. 465-471. (Year: 2018).*

European extended search report issued Nov. 9, 2022 in European Patent application No. 22177179.3.

CNIPA official action issued Dec. 6, 2023, in CN202210658983.2.

\* cited by examiner

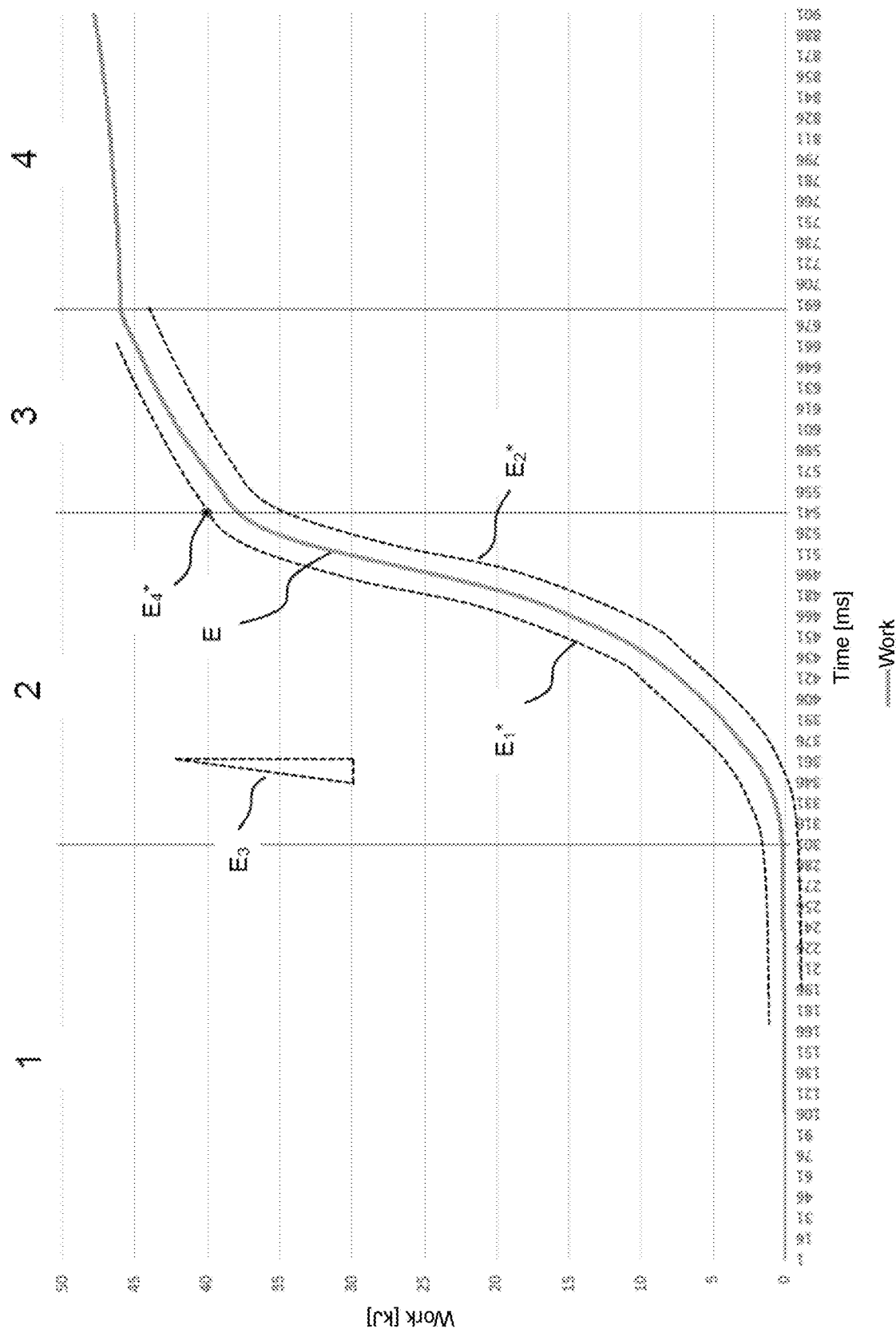

METHOD AND DEVICE FOR MONITORING AND/OR CONTROLLING A FLOW-DRILLING AND THREAD-FORMING PROCESS

TECHNICAL FIELD OF THE INVENTION

The present invention relates to a method and a device for a joining process, in particular a flow-drilling and thread-forming process, which can also be referred to for the sake of simplicity below as a "screwing process" or "joining process."

BACKGROUND OF THE INVENTION

In a joining process, a joining element is introduced in several directly successive process steps into a workpiece, the term "workpiece" generally being understood to mean two elements to be joined that are bearing one against another. In particular, the joining element can be a flow-drill screw. Comparable elements are also referred to as "flow push elements" or "flow-hole forming clinch studs." The explanations below therefore relate to the concrete embodiment of the joining elements as "flow-drill screw" or simply "screw" as a representative of the more general term "joining element" in simplified terminology.

In the known joining process using a flow-drill screw, the screw is first positioned with its tip on the work piece (locating). Then the rotational speed is increased and the screw is pressed at high pressure against the workpiece, during which the workpiece material heats up and begins to flow. Under high contact pressure and with rapidly decreasing rotational speed, the screw is then pressed into the workpiece up to the beginning of the threaded portion (rim-hole forming). The screw is then driven into the workpiece at a markedly reduced rotational speed and forms a thread therein (thread-forming). Finally, the screw is driven into the work piece until the head makes contact (final tightening).

The transition from one process step to another should be done in a very controlled and deliberate manner. For example, the transition from rim-hole forming to thread forming must be precisely detected. In particular, the rotational speed (but also other process variables such as the pressing force) must be changed in the process only at a sufficient penetration depth in order to begin the transition and also not to penetrate too deeply with an excessive speed so as not to endanger the proper formation of the thread according to the pitch thereof. However, the transition need not be assigned to a specific point in time as a suddenly occurring event. Instead the rim-hole forming can also transition into thread forming in a continuous process with controlled or regulated behavior. The same also applies to the transition between other process steps in the flow-drill screwing process. In the prior art, a changeover point is determined by detecting the penetration depth, for example. It is assumed for instance that rim-hole forming is always finished if the distance of the screw head from the workpiece surface has fallen below a predetermined measure. This fails to take tolerances of the workpiece into consideration, however. If the screw penetrates the workpiece too early, then the thread-forming part of the screw engages with the workpiece at an excessively high speed and processing force, thereby possibly destroying the thread.

Alternatively, using the gradient of the penetration depth as the changeover criterion is known from DE 10 2007 024 627 B3. In this case, the penetration depth per unit time is monitored. At the moment in which the material of the workpiece begins to flow, the screw penetrates into the workpiece. The exceeding of a specifiable threshold value for the increasing gradient "penetration depth vs. time" can be used as the changeover criterion.

SUMMARY OF THE INVENTION

The present invention provides alternative solutions for controlling and regulating the joining process.

According to an aspect of the invention, a method is provided for regulating or controlling the joining process, or the initiation of the individual process steps, on the basis of a process variable E formed in the process that takes into account the work performed or the energy expended for carrying out the joining process. Because the individual process steps of the joining process are accompanied by a typical energy consumption (within certain tolerances) when progressing properly, this energy consumption (or the work performed by the machines participating in the joining process) is used as a criterion for a proper, or possibly a failed, joining process. A process variable E formed during the joining process can also be compared to a comparison value E*, which represents a corresponding process variable formed during a corresponding properly running joining process, for example. A "corresponding properly running joining process" here and in the accompanying claims means a successful, proper instance of the joining process. Also, "corresponding process variable" means a process variable formed in the same manner as the process variable E but during a corresponding properly running joining process. If the process variable (preferably within specifiable tolerances) deviates from the associated comparison value E*, this deviation can serve as an indication of a failed joining process and can be used for further controlling the process or for outputting a corresponding error message.

Alternatively to the energy-related process variable E of the invention, it would theoretically also be possible to monitor different process variables, such as the rotational speed N, the torque M, the feeding force F or the penetration depth Z, during the joining process and to compare them to associated comparison values. However, these variables often interact with one another and, viewed in isolation, do not always yield a clear criterion for whether a joining process is running properly ("OK," "correctly") or not ("NOK," "incorrectly"). The independent consideration of the energy expended or the work performed in the process, on the other hand, delivers a simple and reliable overall criterion for the decision of "OK" or "NOK."

According to another aspect of the invention, a joining device is configured to carry out a method according to the above-mentioned aspects. The joining device includes a control unit which controls the components (robots, feed devices, motors, etc.) that carry out the joining process. The control unit receives signals that can be derived from individual process variables of the method, in particular the process variable E according to the invention, which represents the work performed in the process.

These and other advantages and features of the invention will be apparent from the following description of representative embodiments, considered along with the accompanying drawing.

BRIEF DESCRIPTION OF THE DRAWING

The sole FIGURE shows a diagram in which the work performed during a flow-drilling and thread-forming process (joining process) using a flow-drill screw as the joining element is plotted as the process variable E over time.

DESCRIPTION OF REPRESENTATIVE EMBODIMENTS

A process variable E according to the invention is formed based on the work carried out during the joining process, which can be represented for example in the unit of a kilojoule [kJ]. This value may be captured, for example, based on the power consumption of the machines or motors involved in the joining process. The process variable E need not necessarily be the actual numerical or digital value of the work performed, even if this is advantageous for easy handling. It is instead possible to form the process variable E from an auxiliary value that in turn represents the work performed. For example, the process variable E may contain the work performed in a standardized form (dimensionless) or in relation to one or more other process variables or factors, if this is more practical for the signal processing or the comparison to be carried out. The comparison is then done with a comparison value E* formed analogously to the process variable. As used in this disclosure and the accompanying claims, a process variable that is based on the work performed or energy expended may be either the actual value of work performed (or energy expended) or an auxiliary value derived from the actual value and providing a representation of the work performed or energy expended. Of course, where the process variable E is an actual value of the work performed or energy expended, the comparison value E* employed in accordance with the present invention is also an actual value of the work performed or energy expended in a corresponding properly running joining process. Where the process variable E is an auxiliary value derived from an actual value for the work performed or energy expended, the comparison value E* employed in accordance with the present invention is also an auxiliary value derived in the same fashion as process variable E, but from the work performed or energy expended in a corresponding properly running joining process.

The E-E* comparison also makes it possible to detect existing tolerances regarding the joining element, the material properties or the material thickness of the workpiece in a simple manner. Penetrating a thicker material requires a higher energy expense, specifically for rim-hole forming. If the ascertained process variable E in this case exceeds the associated comparison value E* outside the permissible tolerances, this may be interpreted as an indication of an impermissibly large workpiece thickness. An unexpectedly high energy consumption, on the other hand, may indicate that the joining element has an excessively large diameter. If the work performed exceeds the permissible comparison value only in the "final tightening" process step, this may instead indicate an impermissibly high tightening torque.

The comparison value E* is preferably constant and stored in a database, for example, which can be queried by the controller that controls the joining process or the components necessary therefor. It is also possible to store different comparison values E* for different events or different points in time during the joining process. Thus an advantageous embodiment of the invention provides, for example, storing a separate comparison value E* for each of one or more of the above-mentioned process steps (locating, rim-hole forming, thread forming, final tightening), said comparison values representing the necessary or typical energy expenditure for the respective process step when the process is running correctly ("OK"). The process variable E is formed during the joining process in such a way that it represents the energy actually expended for the individual process steps, so that a corresponding comparison to the respective comparison value E* at the end of each process step is possible. Alternatively, the energy expended for the individual process steps may also be summed up over the entire joining process and compared to a correspondingly formed comparison value after each process step. The following example is intended to illustrate this:

In the table below, the work performed for a given joining process is shown separately and in a cumulative form for each process step:

| Process step | Actual value E | | Target value E* | |
| --- | --- | --- | --- | --- |
| | Work performed [kJ] | Cumulative work [kJ] | Work performed [kJ] | Cumulative work [kJ] |
| Locating | 0.5 | 0.5 | 0.6 | 0.6 |
| Rim-hole forming | 36.5 | 37 | 37 | 37.6 |
| Thread forming | 9 | 46 | 10 | 47.6 |
| Final tightening | 2 | 48 | 2 | 49.6 |

The process variable or actual value E reflects the work actually performed in the respective joining process. The target value or comparison value E* indicates a typical value or an upper threshold value for the respective process step and may be stored, for example, in a storage unit accessible to the control unit. After termination of the "rim-hole forming" process step, for example, the comparison of the process variable E (36.5 kJ) and the comparison value E* (30 kJ) would yield a result of "OK" because the threshold value stored for this process step was not exceeded in this case. If instead of that, the process variable E for the "rim-hole forming" process step were 50 kJ for example, and thus clearly above the associated comparison value of 37 kJ, this would be an indication of a process step not performed correctly and the comparison result would then be "NOK."

A comparison directed to the cumulative energy or work is also possible. After termination of the "thread forming" process step, the actual value according to the above example for the already terminated process steps would be a total of 46 kJ, not exceeding the associated target value of 47.6 kJ and therefore a checking result of "OK" will result from the comparison. The summation process starts with a specifiable starting event, which can be the beginning of the joining process (i.e. the beginning of the "locating" process step) for example. If only the energy of a certain process step or that starting from a certain point in time or event during the joining process is to be captured by the process variable E, then the summation takes place so as to correspond to the beginning of the respective process step or starting from the selected point in time or event of the joining process.

Alternatively to the consideration of the work per total process step or the cumulative work carried out, the process variable E can also represent an energy gradient, for example, the work currently performed per unit time (power) or work per unit distance or penetration depth. Correspondingly formed comparison values again serve as a reference for detecting the running of the process as "OK" or "NOK." For the "rim-hole forming" process step, for example, a maximum gradient of 200 J/ms may be stored as a comparison value E*, which may not be exceeded for an "OK" result of the corresponding process variable E during this process step. If the process variable E is greater than this comparison value E*, this may indicate a material that is more difficult to penetrate. Conversely, falling below a gradient defined by a comparison value (i.e. performing comparatively little work per unit time or penetration depth) may be evaluated as an indication that the joining means is rotating without penetrating the material as planned—the screw is burning up. Different comparison values may be stored for different process steps, the control unit being designed to use the respectively applicable comparison value.

A value range can also be provided as the comparison value E*, within which the process variable E must lie in order to reach a result of "OK" in the comparison of the two values. The value range can be described by an upper and a lower threshold value. Alternatively, a permissible tolerance (e.g. +/−10% or −3% and +15%) can be prescribed, and a process variable E within the resulting tolerance band may be evaluated as "OK."

To perform the method according to the some embodiments, it is expedient to provide a control unit which appropriately controls the capturing of the process variable E, retrieves the respectively relevant comparison values E* from a control unit or ascertains them from other data, carries out the comparison between E and E*, and outputs a control signal and/or a message to the operator depending on the comparison.

According to one advantageous embodiment of the invention, the associated comparison values E* are selected as a function of certain process parameters that are constant for the method. Thus, for example, different process variables E or comparison values E* arise, depending on the nature of the joining element and the workpiece (among other things, diameter, length, material, desired tightening torque, desired process duration, etc.). For joining processes having such processing parameters, which are always present, but vary depending on the method, it is expedient to have corresponding different comparison values stored in a storage unit in order to be able to access the respectively associated comparison values for each joining process.

According to a further advantageous embodiment of the invention, it is conceivable to form the respective comparison value E* to be used on the basis of further process variables which vary in the respective method step. It is possible, for example, to store a comparison curve for the work actually performed during rim-hole forming, the curve providing a defined value for the cumulative or instantaneously performed work for each point in time or each penetration depth. The comparison value in such cases is not constant, but instead depends on the "time" or "penetration depth" process variable. A comparison value E* tracking the joining process "more closely" permits an even more precise monitoring of the method even within the individual process steps, for example in order to be able to interrupt a faulty joining process promptly.

According to a further advantageous embodiment of the invention, some or all comparison values E* are calculated from other data characterizing the method in question, rather than being empirically determined from prior experiments. Depending on the nature of the joining process, the joining element and the workpiece, energy values that represent a proper progression of the respective process step can be calculated for individual process steps. The progression of the process variable E during certain process steps (for example the energy/time or energy/penetration depth gradient) can be calculated within acceptable tolerances in advance and stored in a suitable comparison value E*.

Another possibility for forming suitable comparison values E* consists in capturing the process variable E for multiple preceding and successfully conducted joining process and storing each of them in a suitable form as a comparison value E* for future joining processes ("teaching" or "training") or evaluating or documenting them. Suitable comparison values can be produced in this way from the history of successful joining processes, without having to determine them in some other manner, for example by calculation.

Monitoring the work performed in the joining process according to some embodiments of the invention can advantageously also be used to parameterize the process for a minimum energy consumption or maximum service life of the tools used. By optimizing the changeover times, for example, the energy consumption can be reduced since the rotational speed can be reduced before high torques occur.

Monitoring the work performed in the joining process according to the invention by means of the process variable E allows a particularly simple process control. The progression of the process variable E during the joining process (which could also be referred to as an energy curve) yields a meaningful mapping of the process in a simple manner. Deviations from a comparison value E* or from a comparison curve, which serves as the comparison value E* and represents a proper process progression, can be quickly recognized and evaluated for correcting control signals or for terminating the process.

A joining device according to an example embodiment of the invention is configured to perform the above-mentioned method. Said device preferably includes a control unit which controls the components (robots, feed devices, motors, etc.) that carry out the joining process. In performing the control method, the control unit receives signals that can be derived from individual process variables of the method, in particular the process variable E according to the invention, which represents the work performed in the process. The control unit is additionally configured to retrieve comparison values E* from a connected storage unit and to compare them to the process variable E. For training, the storage unit itself can generate comparison values E* and/or store them in the storage unit, for example. Depending on the comparison result, the control unit can output corresponding messages or signals, particularly in digital form, or feed them to the individual components in order to intervene in the running of the process if necessary.

A method according to one aspect of the invention will be explained in detail below on the basis of a diagram which reproduces the values of the process variable E shown in the table above. The sole FIGURE shows the diagram, in which the work performed during a flow-drilling and thread-forming process (joining process) using a flow-drill screw as the joining element is plotted as the process variable E over time. The joining process is subdivided by vertical separation lines into the temporally successive individual process steps thereof.

At time t=0, the "locating" process step begins (labelled "1" in the FIGURE), which extends over approximately 300 ms. The screw is positioned on the workpiece (locating) in this step. The work performed here (positioning the screw or the joining element with slight contact pressure on the workpiece) adds up to approximately 0.5 kJ.

After termination of this process, "rim-hole forming" begins (labelled "2" in the FIGURE), in which the joining element is pressed at a sharply elevated rotational speed and with increased pressing force against the workpiece. The workpiece is heated thereby and finally begins to flow around the screw tip, so that the screw can be pressed into the workplace. This process step takes approximately 240 ms. The marked increase of work performed, which is approximately 36.5 kJ for this process step alone, is clearly visible. The process variable E, plotted as a cumulative curve, is therefore approximately 37 kJ at the beginning of the third process step.

In this third process step ("thread forming"), which is labelled "3" and begins after approximately 540 ms, the joining element is screwed into the workpiece at a sharply reduced rotational speed and with a largely constant feed rate. The work performed per unit time or penetration depth (energy gradient) is largely constant in this case and the cumulative curve E increases linearly to approximately 46 kJ at time t=690 ms.

After complete formation of the thread, the head of the screw reaches the workpiece surface (head contact) in the fourth process step (labelled "4") and the penetration depth no longer changes significantly. The screw is tightened to the final tightening torque ("final tightening"), for which approximately 2 kJ of work is performed within approximately 200 ms. In the overall joining process, approximately 48 kJ of work was performed within approximately 900 ms, and therefore the process variable E represents approximately this value at the end of the joining process.

The sole FIGURE shows several comparison values $E_1^*$, $E_2^*$, $E_3^*$, $E_4^*$, which can be used individually or jointly for comparison to the process variable E in order to evaluate the proper progression of the joining process.

The first comparison value $E_1^*$ is configured as a curve which represents the maximum work to be performed during the second process, "rim-hole forming." For each point in time during this process step, $E_1^*$ indicates the value of the work to be performed, which the observed process variable E must not exceed if the criterion "OK" is to be considered satisfied. If the process variable E exceeds the comparison value $E_1^*$ during the process, the control unit carrying out the comparison could cancel the joining process and issue a corresponding message.

In a similar manner, the second comparison value $E_2^*$, likewise configured as a curve, represents an energy value dependent on the time (or also on the penetration depth), below which the process variable E must not fall if the criterion "OK" is to be satisfied.

A constant gradient [kJ/t] was chosen as the third comparison value $E_3^*$, which describes the maximum permissible change of the work performed per unit time that still allows an assessment of "OK." In place of the comparison values $E_1^*$ or $E_2^*$, or as a supplement thereto, the third comparison value $E_3^*$ may also be used to check the corresponding behavior of the process variable E. If the work E/t performed in the process increases faster than that which is described by the gradient $E_3^*$, this could be used as a cancellation criterion (analogously, a minimum gradient could also be specified).

Finally, the fourth comparison value $E_4^*$ designates, as a constant value, the total maximum permissible work performed until the conclusion of the rim-hole forming (and in this example it coincides with the curve of the first comparison value $E_1^*$). If only the consideration of the total work or energy expended until the end of the second process step is sufficient, then the fourth comparison value $E_4^*$ alone can be used, which simplifies the assessment overall.

In various embodiments, it is possible to specify different comparison values simultaneously or successively in order to be able to undertake an assessment of the process as "OK" or "NOK" from the comparison between E and E* in the continuing process or at certain process events (for example after conclusion of a process step). For individual process steps, it is especially preferable to use at least one comparison value to be applied only to the process step in question.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A method for monitoring or regulating a flow-drilling and thread-forming process in which a joining element having a threaded portion is driven with a rotational speed, a torque, and a feeding force over a penetration depth into and through a workpiece over a course of performing a joining process with the joining element, the method comprising:
   a) forming at least one process variable that is based on an energy expended for driving the joining element in the course of performing the joining process;
   b) comparing the at least one process variable to at least one comparison value that is based on an energy expended for driving a corresponding joining element in the course of performing a corresponding properly running joining process; and c) outputting a control or display signal dependent on the comparison in order to indicate a proper or faulty running of the joining process or to control the joining process depending on the comparison, wherein the joining process is subdivided into successive process steps, and at least one associated comparison value for each process step is stored in a controller; and wherein the at least one process variable is compared during a selected one of the successive process steps to the associated comparison value of the selected process step.

2. The method of claim 1 wherein the at least one process variable is formed based on a gradient which relates a currently expended energy to one of: a time, the penetration depth, the rotational speed, and the feeding force.

3. The method of claim 1 wherein the joining process comprises:

positioning the joining element on the workpiece;

increasing the rotational speed and pressing the joining element against the workpiece until the workpiece begins to flow, the joining element then being pressed up to a beginning of the thread portion into the workpiece;

driving the joining element into the workpiece, simultaneously forming a thread in the workpiece; and driving the joining element into the workpiece until a head of the joining element bears against the workpiece, and tightening the joining element.

4. The method of claim 1 wherein the at least one comparison value is determined based on process parameters, wherein said process parameters include one or more of a geometry of the joining element, a geometry of the workpiece, a material of the joining element, and a material of the workpiece.

5. The method of claim 1 wherein one or more of the at least one comparison values is automatically generated and stored in a memory using process variables that were ascertained for a plurality of previously successfully completed joining processes.

6. The method of claim 1 wherein the at least one process variable is formed by summing energy expended from a specifiable starting event to a specifiable process event.

7. The method of claim 6 wherein the joining process is subdivided into successive process steps, and at least one associated comparison value for each process step is stored in a controller.

8. The method of claim 7 wherein the at least one process variable is compared after conclusion of one or more of the successive process steps and wherein the at least one comparison value comprises a sum of individual comparison values from corresponding process steps of the corresponding properly running joining process.

9. The method of claim 7 wherein the joining process comprises:

positioning the joining element on the workpiece;

increasing the rotational speed and pressing the joining element against the workpiece until the workpiece begins to flow, the joining element then being pressed up to a beginning of the thread portion into the workpiece;

driving the joining element into the workpiece, simultaneously forming a thread in the workpiece; and driving the joining element into the workpiece until a head of the joining element bears against the workpiece, and tightening the joining element.

10. The method of claim 7 wherein the at least one comparison value is determined based on process parameters, wherein said process parameters include one or more of a geometry of the joining element, a geometry of the workpiece, a material of the joining element, and a material of the workpiece.

11. The method of claim 7 wherein one or more of the at least one comparison values is automatically generated and stored in a memory using process variables that were ascertained for a plurality of previously successfully completed joining processes.

12. A joining device comprising:

a control unit configured to control one or more components for performing a flow-drilling and thread-forming joining process in which a joining element having a threaded portion is driven with a rotational speed, a torque, and a feeding force over a penetration depth into and through a workpiece over a course of performing a joining process with the joining element, the control unit configured for:

a) forming at least one process variable that is based on energy expended for driving the joining element in the course of performing the joining process;

b) comparing the process variable to at least one comparison value that is based on an energy expended for driving a corresponding joining element in the course of performing a corresponding properly running joining process; and c) outputting a control or display signal dependent on the comparison in order to indicate a proper or faulty running of the joining process or to control the joining process depending on the comparison, wherein the joining process is subdivided into successive process steps, and at least one associated comparison value for each process step is stored in a memory and accessed by the control unit, and wherein the at least one process variable is compared during a selected one of the successive process steps to the associated comparison value of the selected process step.

13. The joining device of claim 12 wherein the control unit is further configured to form the at least one process variable based on a gradient which relates currently expended energy to one of: a time, the penetration depth, the rotational speed, and the feeding force.

14. The joining device of claim 12 wherein the control unit is further configured to form the at least one process variable by summing up energy expended from a specifiable starting event to a specifiable process event.

15. The joining device of claim 12 wherein the at least one process variable is compared after conclusion of one or more of the successive process steps and wherein the at least one comparison value comprises a sum of individual comparison values corresponding process steps of the corresponding properly running joining process.

* * * * *